United States Patent
Gastaldi

(10) Patent No.: US 11,725,571 B1
(45) Date of Patent: Aug. 15, 2023

(54) SPARK IGNITION DIRECT INJECTION ENGINE WITH ACTIVE PRE-CHAMBER

(71) Applicant: Saudi Arabian Oil Company, Dhahran (SA)

(72) Inventor: Patrick Gastaldi, Gif sur Yvette (FR)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/660,958

(22) Filed: Apr. 27, 2022

(51) Int. Cl.
  *F02B 19/12* (2006.01)
  *F02M 61/18* (2006.01)
  *F02B 19/18* (2006.01)

(52) U.S. Cl.
  CPC .............. *F02B 19/12* (2013.01); *F02B 19/18* (2013.01); *F02M 61/1813* (2013.01)

(58) Field of Classification Search
  CPC ...... F02B 19/12; F02B 19/18; F02M 61/1813
  See application file for complete search history.

(56) References Cited

U.S. PATENT DOCUMENTS

| | | | |
|---|---|---|---|
| 9,890,690 B2 | 2/2018 | Chiera et al. | |
| 10,364,738 B2 | 7/2019 | VanDerWege | |
| 10,612,454 B2 | 4/2020 | Bedogni et al. | |
| 11,085,402 B1* | 8/2021 | Vroman | F02M 23/04 |
| 2016/0160742 A1 | 6/2016 | Willi et al. | |
| 2017/0138251 A1* | 5/2017 | Watanabe | F02B 19/1019 |
| 2017/0226922 A1* | 8/2017 | Tozzi | F02M 21/0218 |
| 2019/0323415 A1 | 10/2019 | Corrigan et al. | |
| 2019/0390613 A1* | 12/2019 | Takemoto | F02D 19/022 |
| 2020/0256283 A1 | 8/2020 | Marko et al. | |

FOREIGN PATENT DOCUMENTS

WO  2019175318 A1  9/2019

* cited by examiner

*Primary Examiner* — Xiao En Mo
(74) *Attorney, Agent, or Firm* — Osha Bergman Watanabe & Burton LLP

(57) ABSTRACT

A fuel ignition device for an engine having a plurality of cylinders. The fuel ignition device including an active pre-chamber, the active pre-chamber further including a fuel inlet for introducing fuel into the active pre-chamber, a spark plug configured to ignite a fuel-air mixture in the active pre-chamber, and a plurality of holes arranged circumferentially around a lower end of the active pre-chamber, the plurality of holes being configured to provide fluid communication between the central chamber and a combustion main chamber of the gas engine.

18 Claims, 3 Drawing Sheets

SPARK IGNITION DIRECT INJECTION ENGINE WITH ACTIVE PRE-CHAMBER

FIELD OF THE DISCLOSURE

The disclosure relates generally to internal combustion engines (ICE) and more particularly to a method and system of improving the operating range of an ICE.

BACKGROUND

Automakers, consumers, and regulators face a challenge of reducing transport related emissions (of CO2 and criteria pollutants) and improving efficiency without significant increases in the cost of transporting people and goods. Innovation in engine and vehicle technology can help to address this challenge.

High cyclic variation and partial miss firing are typical problems for a spark ignition engine operating with high degree of charge dilution at part load condition. This is due to insufficient ignition kernel development during flame initiation and slow flame propagation during later combustion, which prevents the further efficiency improvement with diluted combustion.

One opportunity for improving engine efficiency and reducing transport related emissions, such as CO2 emissions and other pollutants, without significantly increasing transportation costs, is a concept known as turbulent jet ignition (TJI). TJI uses a pre chamber to prepare a favorable air-fuel mixture for spark ignited combustion. As a result of the combustion, high energy flame jets are ejected from the prechamber into a combustion main chamber, where they ignite a compressed fuel-air mixture in the combustion main chamber. The high energy flame jets provide distributed ignition sites that enable fast combustion and high burn rates of the fuel-air mixture in the combustion main chamber. TJI enables efficient combustion of very lean or dilute mixtures.

SUMMARY

Embodiments herein relate to a fuel ignition device for an engine having a plurality of cylinders. The fuel ignition device including an active pre-chamber, the active pre-chamber further including a fuel inlet for introducing fuel into the active pre-chamber, a spark plug configured to ignite a fuel-air mixture in the active pre-chamber, and a plurality of holes arranged circumferentially around a lower end of the active pre-chamber, the plurality of holes being configured to provide fluid communication between the central chamber and a combustion main chamber of the gas engine.

Other aspects and advantages will be apparent from the following Detailed Description and the appended Claims.

DETAILED DESCRIPTION

Figure 1:
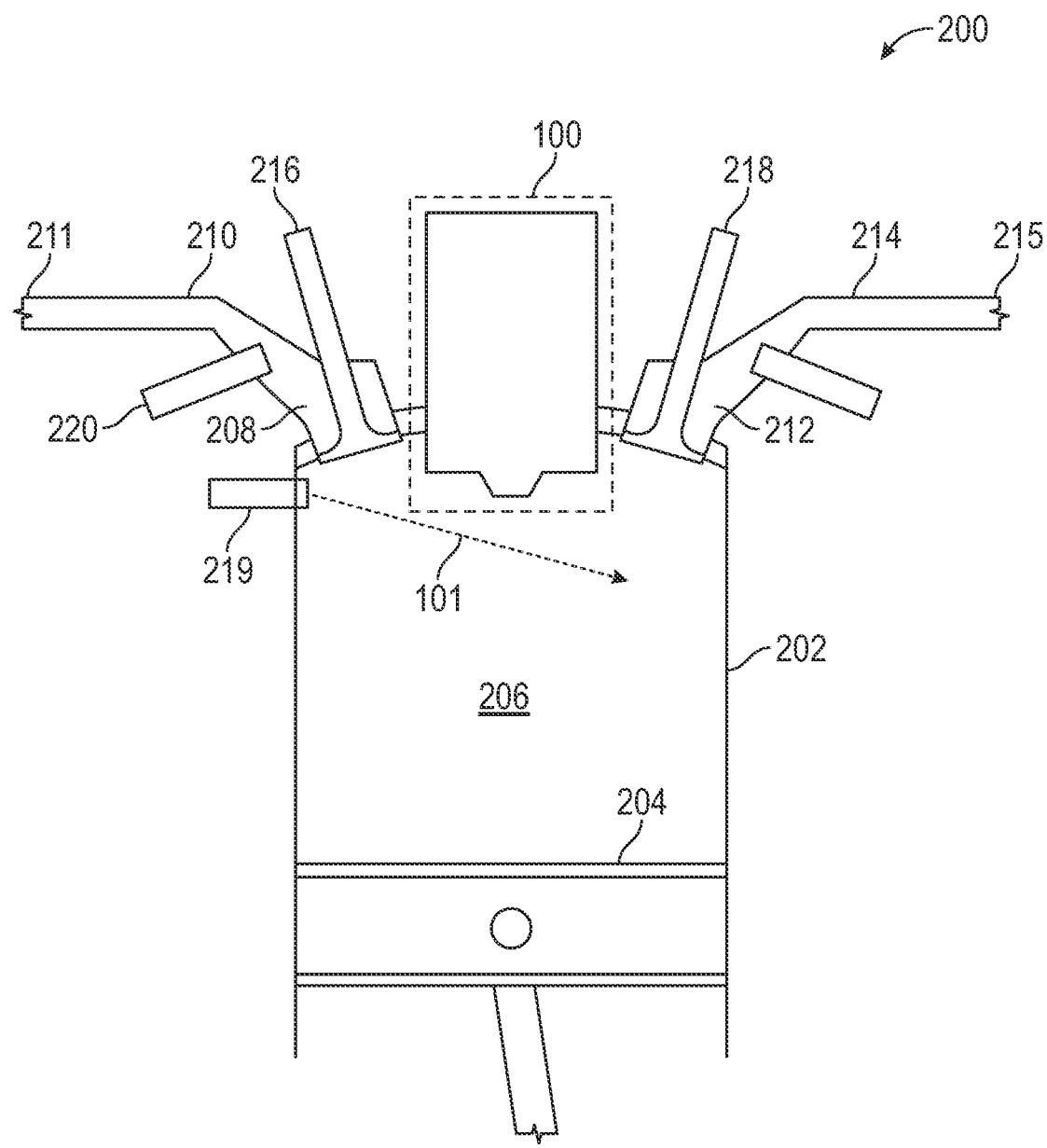
FIG. 1 illustrates an engine cylinder equipped with an active pre-chamber according to one or more embodiments disclosed herein.

For the purpose of this description, a single reference number will be assigned to a line as well as a stream carried in that line. Same reference numbers refer to similar components. The person skilled in the art will readily understand that while the design is illustrated referring to one or more specific combinations of features and measures many of those features and measures are functionally independent from other features and measures. Such features and measures may be equally or similarly applied independently in other embodiments or combinations.

In order to avoid the side effects of using a spark ignited pre-chamber for enabling reliable ignition of highly diluted fuel-air mixture, embodiments disclosed herein use a specific arrangement of hot jets from an active pre-chamber with a conventional direct fuel injection nozzle.

Conventionally sparked, direct injection homogeneous mixture engines are widely used by original equipment manufacturers (OEMs) in order to improve wide open throttle performance, pollutant emissions, and cold operation. The association with TR may allow for significant improvements in efficiency for both low load and stratified operating modes. In the past, direct injection stratified engines have shown good efficiency, but they are sensitive to misfiring when the air-to-fuel ratio in the vicinity of the spark plug is not well controlled. This may be a result of aerodynamics and variations in cylinder to cylinder, or cycle to cycle, dispersions.

The benefit of an active pre-chamber is to improve ignition and start of combustion by generating a slightly rich mixture in the pre-chamber. The combustion in the pre-chamber may ignite varying air-to-fuel ratios and overcome poor dilution or imperfect mixing in the cylinder main chamber. To achieve this, the active pre-chamber produces hot jets. The highly reactive hot jets are introduced in the main chamber and interact with fuel sprays generated by a direct injection. The arrangement of the hot jets and the fuel sprays may be optimized to improve combustion in the main chamber under low load and wide open throttle, and thereby increase the engine efficiency across a large operating range.

The active pre-chamber is a device that emits high temperature combustion gas, or hot jets, into the combustion main chamber to ignite the fuel-air mixture for repeatable combustion. The active pre-chamber is separate from the combustion main chamber of the cylinder. In some embodiments, the active pre-chamber may be external to the engine cylinder. The active pre-chamber may have a fuel inlet and an air inlet. In one or more embodiments, the pressure in the active pre-chamber may be up to 300 bar, such as up to 250 bar, or such as up to 200 bar, and may have a temperature from 200° C. to 2000° C., such as from 400° C. to 1200° C. In one or more embodiments, the active pre-chamber may have a gas chamber volume of between 0.5 vol % to 5 vol % with respect to the cylinder volume. In one or more embodiments, the cylinder volume may be from 250 cm$^3$ to 1000 cm$^3$. The temperature and pressure of the active pre-chamber may be maintained below the ignition condition of the fuel-air mixture to avoid auto-ignition in the active pre-chamber and start of combustion in the main chamber before the desired piston position. This may improve cycle-to-cycle efficiency, reduce the amount of unburnt fuel in the exhaust, reduce emissions, and prevent engine knocking.

U.S. Patent Pub. No. 2019/0323415 discloses a system using an active pre-chamber to combust a small amount of fuel-air in the active pre-chamber and eject a hot jet into the combustion main chamber along a straight line substantially parallel with the center line of the cylinder. The hot jet works in conjunction with a conventional spark plug to initiate ignition in the combustion main chamber. Accordingly, this reference can be thought of as disclosing a process for pre-igniting the fuel-air mixture and using the flame-front of the pre-ignited mixture to assist the ignite the fuel-air mixture in the main cylinder chamber.

Additionally, U.S. Pat. No. 10,612,454 disclose a system using an active pre-chamber to combust a small amount of fuel-air in the active pre-chamber and eject hot jets into the combustion main chamber. The hot jets interact with the fuel being injected from a direct inject fuel port in the combustion main chamber. Like US2019/0323415, this reference can be thought of as disclosing a process for pre-igniting the fuel-air mixture and using the flame-front of the pre-ignited mixture to assist ignition of the fuel-air mixture in the main cylinder chamber in conjunction with a conventional spark plug.

In contrast, the active pre-chamber according to one or more embodiments disclosed herein emits a plurality of hot jets into the combustion main chamber to ignite the fuel-air mixture directly in the combustion main chamber using a specific arrangement of hot jets and direct injection fuel streams in the combustion main chamber. The hot jets generated in one combustion cycle have a temperature above the chemical kinetic requirement of the fuel-air mixture under compression during the later portion of the compression stroke. The hot jets then ignites and combusts the fuel-air mixture in the combustion main chamber without the need for a conventional spark plug to operate efficiently under low load. As used herein, a late or later portion of the compression stroke refers to the piston being at greater than 75%, greater than 80%, greater than 85%, greater than 90%, greater than 95%, or greater than 98% of stroke, such as from 45 crank angle degree to 5 crank angle degree, or from 15 crank angle degree to 5 crank angle degree from top dead center. In other words, the fuel-air mixture is fully compressed or almost fully compressed before the hot jets are released to initiate ignition of the fuel-air mixture in the combustion main chamber.

This active pre-chamber may include a small metal cavity with orifice(s), an air inlet nozzle, a fuel inlet nozzle, and a spark plug. As the engine cycle proceeds and combustion initiation is required, air and fuel are injected through the air inlet nozzle and the fuel inlet nozzle to create a fuel-air mixture in the active pre-chamber. The premixed fuel-air mixture is ignited using the spark plug. After ignition, combustion gases expand and are ejected from the orifices and into the main combustion body. After that, the next iteration of combustion cycle repeats. In this manner, ignition in the combustion main chamber may be controlled cycle-to-cycle.

Referring now to the Figures, FIG. 1 shows a system including the active pre-chamber 100 in an engine 200. Engine 200 includes an engine cylinder 202 formed within an engine body or engine block (not shown). For ease of illustration, engine 200 is shown with a single engine cylinder 202. However, engine 200 is not limited to a single cylinder and may have multiple cylinders, such as any number from 1-16 cylinders arranged inline, in a v-shape, or in a flat-plane. A piston 204 is arranged to move back and forth inside engine cylinder 202. Piston 204 is connected to a crankshaft (not shown), which converts the reciprocating motion of piston 204 into rotary motion, as is well known in the art of reciprocating internal combustion engines. Combustion main chamber 206 is defined within engine cylinder 202. The volume of the combustion main chamber 206 depends on the position of piston 204 within engine cylinder 202. The head of engine cylinder 202 includes at least one intake port 208 and at least one exhaust port 212. As illustrated, the engine may have one intake port 208 and one exhaust port 212, however in one or more embodiments the engine cylinder may have two or three intake ports and exhaust ports. However, in one or more embodiments, the engine may have one to three intake ports with one to three intake valves, and one to two exhaust ports with one to two exhaust valves. Intake port(s) 208 is (are) in fluid communication with an intake line 210. Intake line 210 has an inlet end 211 to receive air from the ambient environment. Intake line 210 may include a particulate filter (not shown) to remove particulate material from the received, ambient air. In one or more embodiments, the engine may also be fitted with a forced induction system (not shown) such as a supercharger or turbocharger system. Conventionally, a supercharger may use rotational energy provided by the engine to spin one or more compressors which may increase the pressure of the air intake, and thus increase the amount of air in the engine for combustion with fuel. Turbochargers operate similarly, but the rotational energy of the turbocharger is provided by exhaust gas spinning a turbine attached to a compressor. The compressor receives ambient air and feeds the air into the engine at higher pressure. In embodiments where a supercharger or turbocharger system are used, an air filter may be placed upstream of the compressor inlet.

Returning now to FIG. 1, exhaust port(s) 212 is (are) in fluid communication with an exhaust line 214. Exhaust line 214 has an outlet 215 to discharge exhaust gases to the ambient environment. Exhaust line 214 may include an exhaust emission control device (e.g., a catalytic converter, not shown) to reduce toxic gases and pollutants in the exhaust gases discharged to the ambient environment.

Intake line 210 terminates in an intake manifold (not shown). The flow of air from the intake manifold into intake line 210 may be controlled by a throttle valve. An intake valve 216 is arranged at intake port 208 to control flow from intake line 210 into combustion main chamber 206. As illustrated, the engine may have one intake port 208, however in one or more embodiments the engine cylinder may have two or three intake ports. Each intake port 208 will have an intake valve 216. Similarly, the engine may have one exhaust port 212, however in one or more embodiments the engine cylinder may have two exhaust ports. Each exhaust port 212 will have an exhaust valve 218. In one or more embodiments, the engine may be a four valve per cylinder type engine with two intake valves 216 and two exhaust valves 218.

In normal operation, direct injection fuel injector 219 may be positioned to inject a plurality of fuel streams 101 into the combustion main chamber 206 near the outlet orifices of the active pre-chamber 100. In one or more embodiments, a port fuel injector 220 may be positioned to inject fuel into the air flowing into intake port 208 from intake line 210. Alternatively, both port injection and direct injection of fuel into combustion main chamber 206 may be used.

Fuel may be injected by the fuel injector 219 into the combustion main chamber 206 at high pressures to encourage atomization of the fuel in the air that is present in the combustion main chamber. Atomization of the fuel may enhance combustion efficiency of the internal combustion engine and may decrease formation of particulate matter emissions, as well as NOx and carbon monoxide, when the air-fuel mixture is combusted and reduce the amount of unreacted hydrocarbons exiting the engine during the exhaust stroke. In some embodiments, injection of the fuel at high pressures may allow for fuel to be injected a relatively far distance within the combustion main chamber so that the air-fuel mixture can be well mixed at the time the air-fuel mixture is combusted by the plurality of hot jets ejected from the active pre-chamber 100. In some embodiments, the fuel may be injected at a pressure of at least about 100 bar, for example, at least about 120 bar, for example, at least about 140 bar, for example, at least about 160 bar, for example, at least about 180 bar, for example, at least about 200 bar. In some embodiments, the fuel may be injected at even higher pressures, for example, at least about 500 bar, for example, at least about 750 bar, for example, up to about 800 bar. Injection of fuel at high pressures may improve atomization of the fuel in the combustion main chamber. Good atomization and mixing of the fuel in the combustion main chamber may be exhibited as improved power delivery of the engine.

Engine cylinder 202 may operate on a four-stroke cycle including an intake stroke, a compression stroke, a power stroke, and an exhaust stroke. During the intake stroke, intake valve(s) 216 is (are) open, exhaust valve(s) 218 is (are) closed, and air is drawn into combustion main chamber 206. During the compression stroke, intakes valve(s) 216 and exhaust valve(s) 218 are closed, and the air in combustion main chamber 206 is compressed by piston 204. Fuel and air are also injected to active pre-chamber 100. At the end of compression stroke, or during a late portion of the compression stroke, the injector 219 injects fuel into the combustion main chamber 206 and the spark plug in the active pre-chamber 100 ignites the fuel-air mixture in the active pre-chamber 100, producing a plurality of hot jets that exit the active pre-chamber 100 into the combustion main chamber 206. The plurality of hot jets interact with the direct injection fuel stream 101 initiating combustion in the combustion main chamber 206, starting the power stroke, or combustion stroke. During the power stroke, the high-pressure gases produced from combustion of the fuel-air mixture in combustion main chamber 206 expand and push piston 204 down, generating force on the crank and shaft and useful work. During this stroke, intake valve(s) 216 is (are) closed, and exhaust valve(s) 218 is (are) closed. The timing of opening and closing of valves 216, 218 and operation of injector 219, during the various strokes may be controlled by a computer (not shown).

At the end of the combustion stroke, exhaust valve(s) 218 is (are) opened, thereby starting the exhaust stroke. At the end of the exhaust stroke, exhaust valve(s) 218 is (are) closed and inlet valve(s) 216 is (are) opened, thereby starting the next intake stroke.

Figure 2:
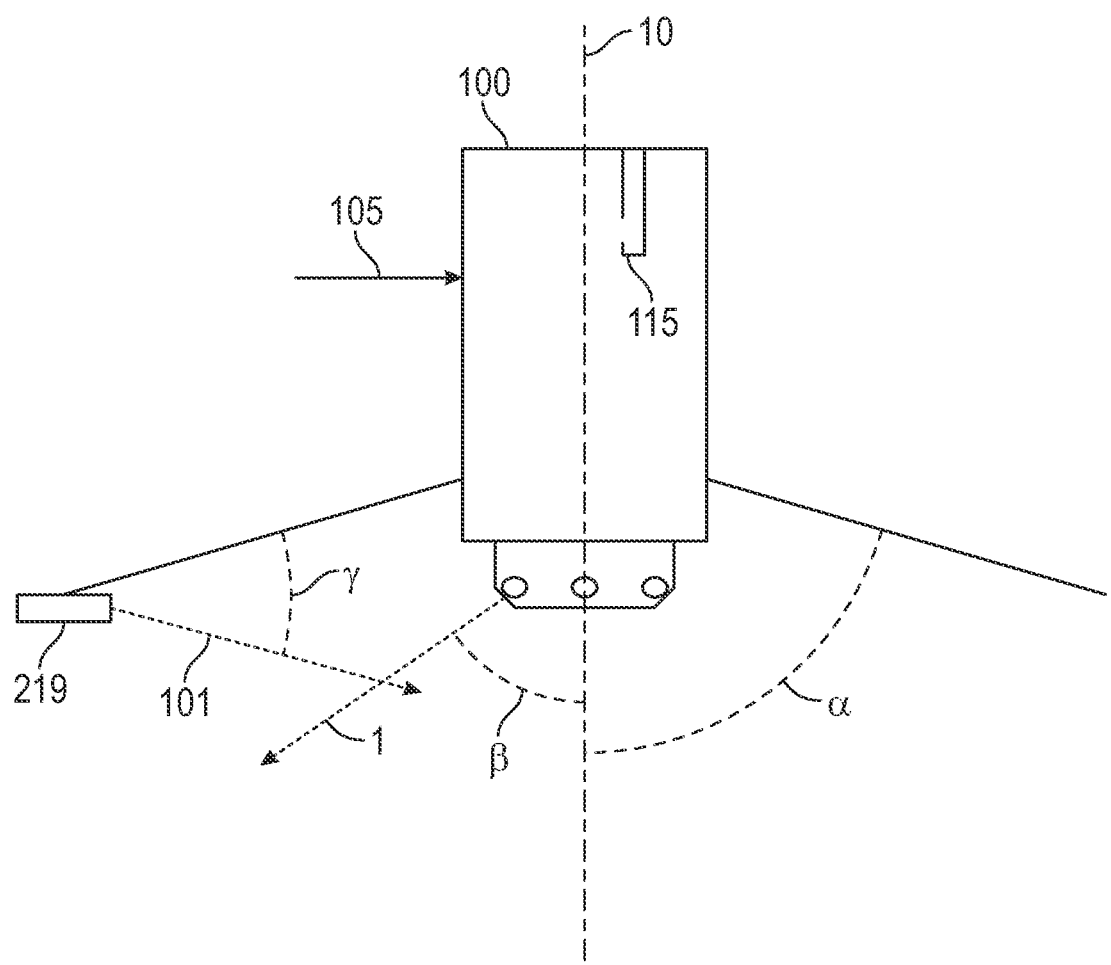
FIG. 2 illustrates a portion of an engine cylinder equipped with an active pre-chamber according to one or more embodiments disclosed herein.
Figure 3:
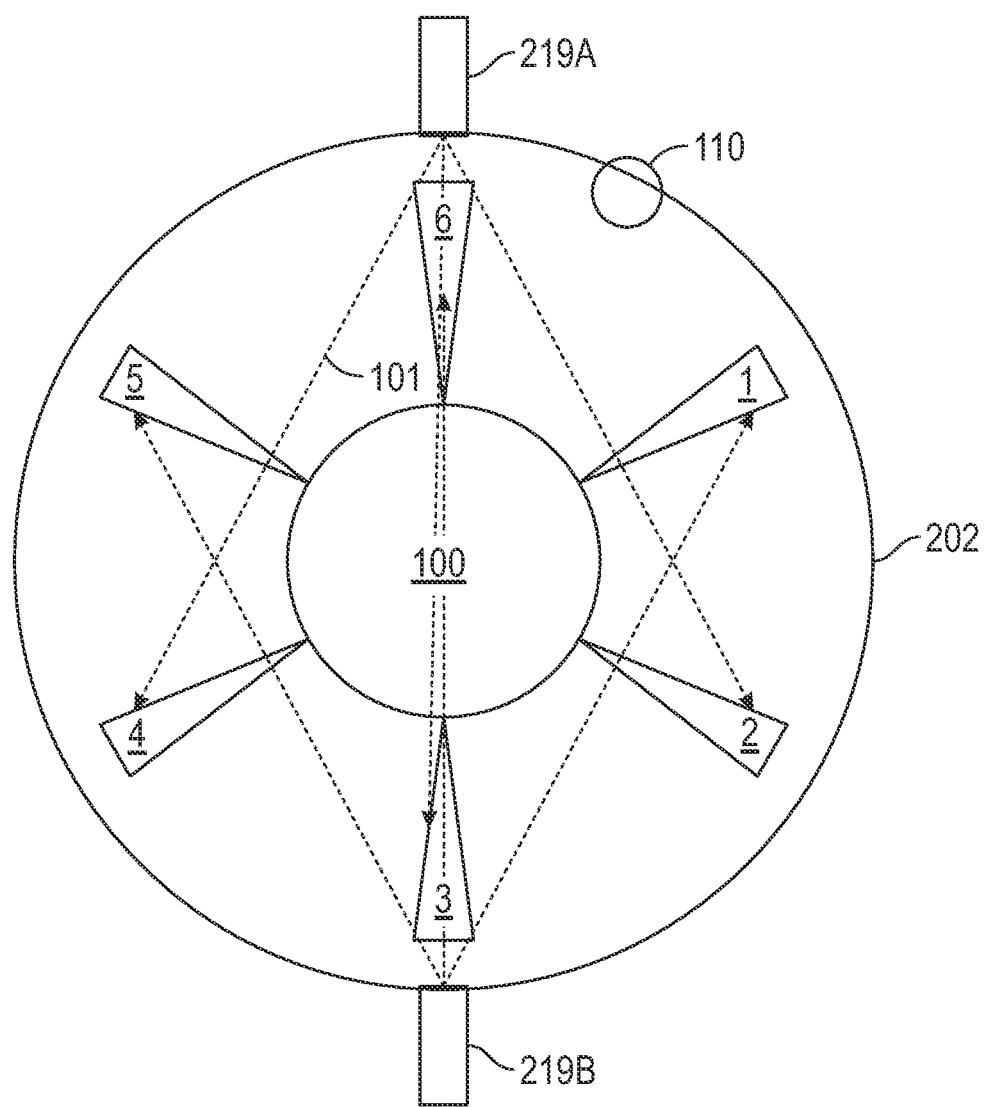
FIG. 3 illustrates an engine cylinder equipped with an active pre-chamber according to one or more embodiments disclosed herein.

Referring now to FIG. 2, a simplified illustration of a cylinder head equipped with an active pre-chamber 100 is illustrated. Referring also to FIG. 3, a top down view of the engine cylinder 202 with an active pre-chamber 100 is illustrated. The active pre-chamber may be along the center line 10 of the engine cylinder 202. The active pre-chamber 100 may be equipped with a fuel inlet 105 and spark plug 115. In one or more embodiments, the fuel inlet 105 may be a combination fuel-air inlet. In embodiments where fuel inlet 105 is not a combination fuel-air inlet, the active-prechamber may be charged with air from the engine cylinder during the intake stroke. The active pre-chamber 100 may also be equipped with a plurality of holes which generate the hot jets. The active pre-chamber 100 may have between 3 and 9 holes arrange circumferentially around the lower end of the active pre-chamber with equal angles of rotation around the lower end. As illustrated in FIG. 3, the active pre-chamber is equipped with 6 holes, arranged at 60° circumferentially around the lower end of the active pre-chamber with respect to each other, which generate hot jets 1, 2, 3, 4, 5, and 6. As illustrated in FIG. 2, the angle $\beta$ between the hot jet and the centerline 10 may be between 60 and 80°. The angle $\alpha$ between the head of the cylinder main body and the centerline 10 may be between 60 and 90°. The angle $\gamma$ between the cylinder main body and the fuel stream 101 may be between 20 and 50°. The engine cylinder 202 may also be equipped with a pressure sensor 110.

As illustrated in FIG. 3, at least one fuel injector 219A may be located on a side of the engine cylinder 202, such as under the intake ports or the exhaust ports. The fuel injector 219A may generate a plurality of fuel streams 101 in directions such that the fuel streams 101 interact with the hot jets 1, 2, 3, 4, 5, and 6. For example, a first fuel stream 101 may have an orientation substantially parallel to hot jets 6 and 3. A second fuel stream 101 may have an orientation that brings the fuel stream into contact with hot jet 1 and 2. A third fuel stream 101 may have an orientation that brings the fuel stream into contact with hot jet 4 and 5. In such a way, the thermal energy of the hot jets may initiate and result in complete, or near complete, combustion of the fuel in fuel streams 101. In one or more embodiments, a second fuel injector 219B may be arranged opposite fuel injector 219A. The fuel injector 219B may have a fuel stream 101 pattern similar to fuel injector 219A such that the fuel streams 101 interact with hot jets 1, 2, 3, 4, 5, and 6, as illustrated. The orientation of the fuel stream that intersects hot jets 1 and 2 may be oriented so the fuel stream intersects the hot jets at cylinder diameter between half and ⅔ of the radius. Similarly, the orientation of the fuel stream that intersects hot jets 4 and 5 may be oriented so the fuel stream intersects the hot jets at cylinder diameter between half and ⅔ of the radius. The three adjected hot jets may be located in a plane which may not intersect the cylinder head near top dead center.

As the hots jets 1, 2, 3, 4, 5, and 6 generated by the plurality of holes in the active pre-chamber 100 are providing active radicals, turbulence, and enthalpy thereby promoting a quick and efficient ignition of the fuel sprays and the air in the combustion main chamber. As such, no bulk air motion is necessary to enhance the combustion of the fuel-air mixture, allowing the system to have straight intake ports or simplified air intake valves.

For homogeneous operation, such as at high engine loads, the fuel injection may be activated early during the intake stroke in order to mix fuel and air more evenly. The centrally located active pre-chamber may provide hot and reactive gases to ignite the prepared mixture as previously described. The advantages of such a system reduce sensitivity to knock and a quick combustion, potentially allowing for a high compression ratio and a high potential for dilution (lean burn or exhaust gas recirculation, for example).

Stratified engine operation generally refers to instances where fuel and air do not mix uniformly. This may create fuel rich regions in the combustion main chamber, fuel poor regions in the combustion main chamber, or both. For stratified operation of the engine at low to medium loads, the arrangement of the fuel streams 101 compared to the hot jets 1, 2, 3, 4, 5, and 6 may be specifically designed. The arrangement illustrated in FIG. 3 may produce three different wide combustion areas, the first one along the line from hot jet 6 to 2. The second stream along the line from hot jet 6 to 3. The third stream along the line from hot jet 6 to 4. In embodiments where a second fuel injector is located opposite the first fuel injector, a similar combustion pattern may be formed on the opposite side of the hot jet arrangement. Such arrangement may secure ignition, which can be a major challenge with stratified mixtures.

During low engine loads, fuel may be injected into the combustion main chamber at a later stage of the intake stroke. With the late injection, the combustion may still be initiated with the arrangement of fuel streams and hot jets on the side of the active pre-chamber with the fuel injector. At higher loads, a part of the fuel stream may penetrate farther into the combustion main chamber and be partially ignited by the hot jets on the opposite side of the combustion main chamber. Accordingly, at both low and high loads, whether the fuel-air mixture is stratified or not, the arrangement of fuel streams and hot jets may be sufficient for complete combustion. In one or more embodiments, in low engine loads, the fuel-air mixture may be stratified. Using the arrangement of fuel streams and hot jets, a decreased consumption of fuel may be observed.

Additionally, in one or more embodiments, the active pre-chamber may be controlled by a control system. The control system may be configured to actuate the fuel inlet, air inlet, and spark plug during varying stages of the engine cycle. In this manner, the active pre-chamber may be charged and discharged during each complete cycle of the engine cylinder.

The control system may be configured to produce a fuel-air mixture rich in fuel in the active pre-chamber while the total fuel-air mixture in the active pre-chamber and combustion main chamber is at a stoichiometric ratio. In such embodiments, the system disclosed herein may ensure complete combustion at both low and high engine loads while still maintaining acceptably low emissions rates.

The active pre-chamber in the engine according to one or more embodiments may also be sufficient to ensure complete combustion without the need of a primary spark plug in the combustion main chamber.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A fuel ignition device for an engine having a plurality of cylinders, comprising:
   an active pre-chamber, the active pre-chamber comprising:
     a fuel inlet for introducing fuel into the active pre-chamber;
     a spark plug configured to ignite a fuel-air mixture in the active pre-chamber; and
     a plurality of holes arranged circumferentially around a lower end of the active pre-chamber, the plurality of holes being configured to provide fluid communication between the central chamber and a combustion main chamber of the engine;
     wherein each of the plurality of holes are configured to produce a hot jet into the combustion main chamber at an angle between 60 and 80° with respect to a centerline through the active pre-chamber and the combustion main chamber.

2. The fuel ignition device according to claim 1, wherein the plurality of holes comprises three to nine holes arranged at equal angles of rotation around the lower end of the active pre-chamber.

3. The fuel ignition device according to claim 2, wherein the plurality of holes comprises six holes arranged at 60° of rotation around the lower end of the active pre-chamber from each other.

4. The fuel ignition device according to claim 3, wherein the plurality of cylinders further comprises one or more direct fuel injection nozzles and at least one air intake port.

5. The fuel ignition device according to claim 4, wherein the one or more direct fuel injection nozzles are configured to introduce one or more fuel streams into the combustion main chamber at an angle between 20 and 50° with respect to a horizontal top of the plurality of cylinders.

6. The fuel ignition device according to claim 5, wherein the top of the plurality of cylinders has an angle between 60 to 90° with respect to a centerline through the active pre-chamber and the combustion main chamber.

7. The fuel ignition device according to claim 4, wherein the one or more direct fuel injection nozzles comprises a first direct fuel injection nozzle and the one or more fuel streams are configured to interact with one or more of the hot jets.

8. The fuel ignition device according to claim 7, wherein the one or more fuel streams comprises a first fuel stream, a second fuel stream, and a third fuel stream, and the plurality of holes produce a first hot jet, a second hot jet, a third hot jet, a fourth hot jet, a fifth hot jet, and a sixth hot jet.

9. The fuel ignition device according to claim 8, wherein the first fuel stream is oriented to intersect the sixth hot jet and the third hot jet, the second fuel steam is oriented to intersect the first hot jet and the second hot jet, and the third fuel stream is oriented to intersect the fifth hot jet and the fourth hot jet.

10. The fuel ignition device according to claim 9, wherein the one or more direct fuel injection nozzles comprises a second direct fuel injection nozzle and the one or more fuel streams are configured to interact with one or more of the hot jets.

11. The fuel ignition device according to claim 10, wherein the one or more fuel streams comprises a fourth fuel stream, a fifth fuel stream, and a sixth fuel stream, and the plurality of holes produce a first hot jet, a second hot jet, a third hot jet, a fourth hot jet, a fifth hot jet, and a sixth hot jet.

12. The fuel ignition device according to claim 11, wherein the fourth fuel stream is oriented to intersect the third hot jet and the sixth hot jet, the fifth fuel steam is oriented to intersect the fourth hot jet and the fifth hot jet, and the sixth fuel stream is oriented to intersect the second hot jet and the first hot jet.

13. A method for igniting a fuel-air mixture in a gas engine using the fuel ignition device of claim 1.

14. An engine comprising the fuel ignition device of claim 1.

15. The engine according to claim 14, further comprising one or more direct fuel injection nozzles.

16. The engine according to claim 14, further comprising one or more port fuel injection nozzles.

17. The engine according to claim 14, further comprising one or more direct fuel injection nozzles and one or more port fuel injection nozzles.

18. An engine comprising:
a fuel ignition device having a plurality of cylinders, the fuel ignition device comprising:
an active pre-chamber, the active pre-chamber comprising:
a fuel inlet for introducing fuel into the active pre-chamber;
a spark plug configured to ignite a fuel-air mixture in the active pre-chamber; and
a plurality of holes arranged circumferentially around a lower end of the active pre-chamber, the plurality of holes being configured to provide fluid communication between the central chamber and a combustion main chamber of the engine;
wherein each of the plurality of holes are configured to produce a hot jet into the combustion main chamber at an angle between 60 and 80° with respect to a centerline through the active pre-chamber and the combustion main chamber;
wherein the engine does not include one or more spark plugs in the combustion main chamber.

* * * * *